United States Patent [19]

Bisker

[11] Patent Number: 4,723,055

[45] Date of Patent: Feb. 2, 1988

[54] MULTI-WIRE CONDUIT DAM AND METHOD OF FORMING SAME

[75] Inventor: Richard G. Bisker, Salisbury, Md.

[73] Assignee: Dresser Industries, Inc., Dallas, Tex.

[21] Appl. No.: 26,766

[22] Filed: Mar. 17, 1987

[51] Int. Cl.$^4$ ........................................ H02G 15/013
[52] U.S. Cl. ..................................... 174/77 R; 156/55;
156/185; 174/23 R; 174/72 A; 206/344;
206/346
[58] Field of Search .................. 174/23 R, 72 A, 76,
174/77 R, 99 R, 100, 117 F, 117 AS; 29/755;
156/55, 56, 185, 296, 433; 206/330, 344, 345,
346, 347; 277/1, 12

[56] References Cited

U.S. PATENT DOCUMENTS

| | | | |
|---|---|---|---|
| 243,180 | 6/1881 | Ware | 174/117 F X |
| 354,462 | 12/1886 | Copeland | 206/345 |
| 1,378,550 | 5/1921 | Miller | 206/344 |
| 1,851,940 | 3/1932 | Williams | 174/23 R X |
| 2,835,722 | 5/1958 | Appleton | 174/23 R X |
| 3,881,976 | 5/1975 | Jones | 156/296 X |
| 4,216,349 | 8/1980 | Winn | 174/77 R X |
| 4,332,975 | 6/1982 | Dienes | 174/77 R X |
| 4,409,430 | 10/1983 | Boscher et al. | 174/77 R X |
| 4,415,765 | 11/1983 | Iwasa et al. | 174/72 A |
| 4,576,662 | 3/1986 | Lemke | 156/55 X |

FOREIGN PATENT DOCUMENTS 1334397  7/1963  France .................. 174/99 R

Primary Examiner—Laramie E. Askin
Attorney, Agent, or Firm—Sigalos & Levine

[57] ABSTRACT

A multi-wire conduit dam consisting of a molded strip of closed cell sponge rubber or equivalent that is shaped like a timing belt having recesses on at least one side with the recessed surface coated with adhesive or double sided adhesive tape after wires are placed in the recesses. The strip is then rolled together to form a cylindrical dam which may then be installed in an appropriate conduit.

7 Claims, 6 Drawing Figures

MULTI-WIRE CONDUIT DAM AND METHOD OF FORMING SAME

BACKGROUND OF THE INVENTION

The present invention relates to a multi-wire conduit dam to provide a dam, when installed in a conduit having multiple wires, that would separate each wire from the other and, when the dam is inserted in a conduit, prevent sealing compound from entering the conduit below the dam.

In particular, the multi-wire conduit dam consists of a molded strip of closed cell sponge rubber or equivalent that is shaped like a timing belt with a plurality of notches or grooves formed therein. The wires are placed in the grooves of the dam and either liquid adhesive or double sided adhesive tape is placed over the wires and the dam. The dam is then rolled together forming a cylinder which holds its shape because of the adhesive. The wire assembly and dam are then installed in an appropriate conduit.

It is important in the electrical cable art to be able to seal wire harnesses which are installed in conduits, each of which may have from one to forty wires passing through the conduit. This is accomplished in the prior art by putting a disk of some type, such as cork, in the end of the conduit and putting each wire in the conduit through an individual orifice in the disk. Thus the disk has at least as many orifices as there are wires. The wires can then have electrical plugs or connectors attached to the ends thereof and the dam can be sealed in the conduit with a sealant of any well-known type by filling the end of the conduit with the sealant to the point at which the disk is located within the conduit.

There are obviously several disadvantages to this apparatus and process. In the first place, a different size diameter dam must be used to seal each different size diameter conduit. Secondly, the dam must be assembled with the wire harness before the plugs and/or connectors can be put on the ends of the wires since the wires have to be inserted in the orifices in the disk. Thirdly, dams with the exact number of orifices required for the exact number of wires must be used or extra orifices must be sealed or plugged inasmuch as any unused, unplugged orifices would allow the sealing compound to pass through the orifices into the space behind the dam into the conduit.

The present invention overcomes the disadvantages of the prior art by forming the dam from a molded strip of closed cell sponge rubber such as neoprene closed cell sponge, or equivalent, and forming grooves or notches on at least one side of the molded strip so that it is shaped like a timing belt. The harness wires can be separated and each wire placed in a corresponding groove or notch with an adhesive or a double sided adhesive tape placed over the wires and the strip. The strip can then be rolled together forming a cylindrical dam with the adhesive maintaining the cylindrical shape. The wire assembly and cylindrical dam are then installed in an appropriate conduit. The molded strip consists of equally spaced recesses or notches molded on at least one side, but preferably only one side of the strip to a depth of the wire diameter which will be less than half the thickness of the strip. As stated, the strips are molded of an elastic material such a neoprene which is soft enough to compress and seal any recess that does not have a wire in it to eliminate the necessity of plugs for unused recesses or notches.

The diameter of the conduit does not have to change with the present invention because a varied number of wires might be sealed in a particular conduit. The molded strip can be trimmed or simply cut to the proper length for small conduits or variations in the number of wires required to be sealed.

An adhesive or a double sided adhesive tape can be applied to the open recessed side of the molded strip to allow the strip with the wire harness, when rolled into a cylindrical shape, to hold its shape until it is installed in a conduit. A smooth surface tape such as electricians tape may be applied to the outside of the cylindrical assembly to allow for easy insertion into the conduit. Because the elastic molded strip is formed of a compressible material, it will allow the cylindrical dam to be compressed for installation in a conduit where it will then expand to seal the inside of the conduit to prevent sealant from getting past the cylindrical dam into the conduit behind the dam.

Thus it is an object of the present invention to provide a multi-wire conduit dam formed of a molded strip of compressible material having a plurality of recesses on at least one side of the strip, with at least one electrical conductor positioned in a respective one of the recesses and an adhesive placed over the recess and the at least one conductor to cause the strip to hold its shape when the strip is rolled into a cylinder.

It is also an object of the present invention to provide the multi-wire conduit dam formed from a molded strip of compressible material having a plurality of equally spaced recesses on at least one side of the strip for receiving the wires.

It is yet another object of the present invention to provide a multi-wire conduit dam formed from a molded strip of compressible material having a plurality of equally spaced recesses on at least one side of the strip for receiving the wires and having a double sided adhesive tape placed over the recesses and the wires in the recesses to cause a strip to hold its shape when the strip is rolled into a cylinder.

SUMMARY OF THE INVENTION

Thus the present invention relates to a multi-wire conduit dam comprising a molded strip of compressible material having a plurality of recesses on at least one side of the strip, at least one electrical conductor positioned in a respective one of the recesses, an adhesive placed over the recesses and the at least one conductor to cause the strip to hold its shape when the strip is rolled into a cylinder, and a smooth surface tape applied to the outside of the rolled cylinder for allowing easy insertion of the cylinder with the at least one conductor into a conduit to form a conduit dam.

The invention also relates to method of forming a multi-wire conduit dam comprising the steps of forming a molded strip of compressible material having a plurality of recesses on at least one side of the strip, positioning at least one electrical conductor in the respective one of the recesses, placing an adhesive over the recesses and the at least one conductor to cause the strip to hold its shape when the strip is rolled into a cylinder, and applying a smooth surface tape to the outside of the rolled cylinder to allow easy insertion of the cylinder with the at least one conductor into a conduit to form a conduit dam.

BRIEF DESCRIPTION OF THE DRAWINGS

These and other objects of the present invention will be disclosed more fully in conjunction with the accompanying drawings in which like numbers represent like components, and in which.

DETAILED DESCRIPTION OF THE DRAWINGS

Figure 1:
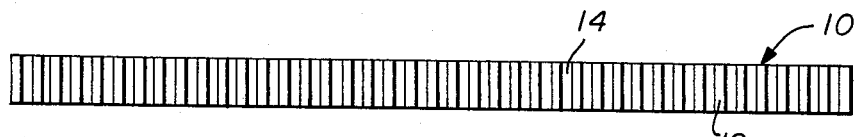
FIG. 1 is a plan view of a neoprene strip having a plurality of recesses therein into each of which a corresponding one of a plurality of wire conductors may be placed to form a conduit dam.
Figure 2:
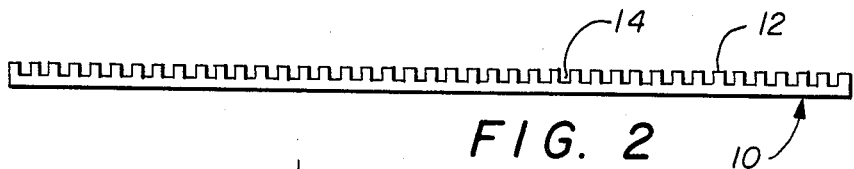
FIG. 2 is a side view of the neoprene strip in FIG. 1 illustrating the timing belt effect or shape of the belt caused by the recesses or grooves equally spaced on at least one side thereof.

FIG. 1 is a plan view of a neoprene closed cell sponge strip 10 which has a plurality of teeth-like portions 12 formed by a plurality of equally spaced recesses 14 on one side of the belt. This can be seen more clearly in FIG. 2 which is a side view of the strip shown in FIG. 1. Strip 10 is molded of an elastic material such as neoprene which is soft enough to compress and seal any recess that does not have a wire in it to eliminate the necessity of plugs for those individual recesses, as will be explained hereafter. Further, the equally spaced recesses 14 are molded, preferably, on only one side of the strip 10 to a depth of the wire diameter which will be less than half the thickness of the strip 10. The strip may have a width in the plan view as shown in FIG. 1 of any desired size but typically may be 7/16 of an inch. In like manner, the thickness of the strip 10 shown in FIG. 2 may be of any desired thickness but again typically could be 0.250/inch with the depth of each groove being less than half that or approximately 0.100/inch. Also, the thickness of the teeth 12 and the width of the grooves 14 as shown in the side view in FIG. 2 could be of any desired dimensions but, again, would typically approximate 0.100/inch in thickness of both the teeth 12 and the width of grooves 14.

Figure 3:
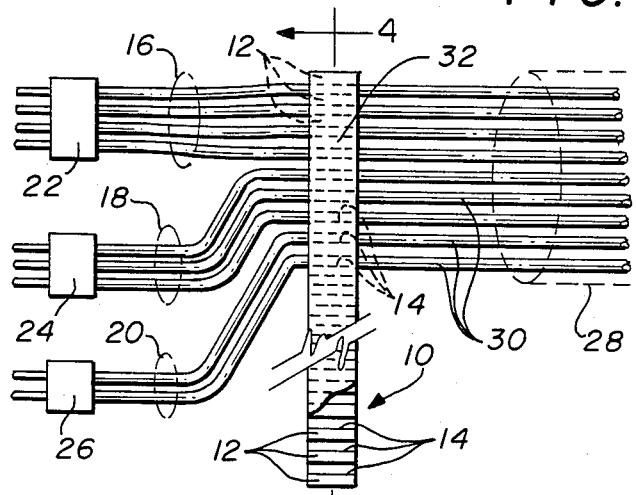
FIG. 3 is a plan view of the neoprene strip with wires from multiple cables being placed in respective ones of the recesses in the strip.

As shown in FIG. 3, a plurality of wire bundles 16, 18 and 20, each having a plurality of wires forming the bundle, may already be connected to plugs 22, 24 and 26. Typically, these wires will come from a single conduit 28. It would be desirable to place a dam near the end of the conduit 28 with a sealant placed in the end of the conduit in front of the dam to prevent moisture and other contaminants from entering the conduit 28.

Figure 4:
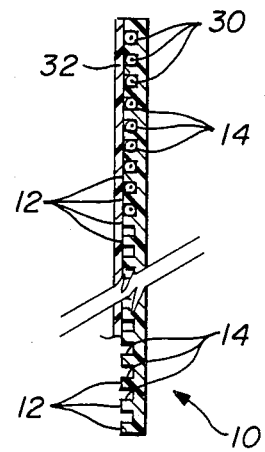
FIG. 4 is a cross-sectional view of the neoprene strip in FIG. 3 taken along lines 4—4 and illustrating an adhesive placed over the conductors and the strip to allow the strip to be rolled into a cylinder with the adhesive holding the cylinder in its cylindrical shape.

Such a dam can be easily made with the strip 10 of the present invention as in FIG. 3. The wires in each of the bundles 16, 18 and 20 are separated and are placed with an individual wire in each of the recesses 14 and in as many of the recesses 14 as is necessary to hold all the wires 30. Then an adhesive 32, as shown in FIG. 4, either in the form of a fast setting liquid or paste or a double sided adhesive tape can be placed across the teeth-like portions 12 of strip 10 over the wires 30 in recesses 14 for purposes as will be described in reference to FIG. 5. It will be noted in FIG. 4, that not all of the recesses 14 contain one of the wires 30. Thus, the molded strip 10 can be trimmed or cut off as necessary where it is not used to form a dam for a particular size conduit.

Figure 5:
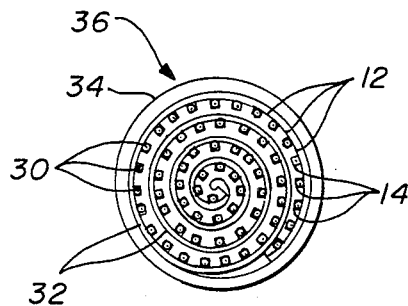
FIG. 5 is an end view of the rolled up dam with the wires therein.

The strip 10 can then be rolled with the wires 30 in place in recesses 14 into a spiral shape as shown in FIG. 5 to form a cylinder 36 with the wires sticking out of the ends thereof. FIG. 5 represents an end view of the dam illustrating the wires 30 in the respective recesses 14. Because the adhesive 32 has been applied to the open recess side of the molded strip, when it is rolled into a cylindrical shape, the adhesive 32 holds and maintains the strip in the cylindrical shape as shown in FIG. 5. A smooth surface tape 34 such as electrical tape can then be applied to the outside of the cylinder assembly to form a smooth surface to allow easy insertion into the conduit 28. Because the strip 10 is compressible, the cylinder can be compressed to allow it to fit inside the conduit where it then expands to extend to and conform with the conduit walls.

Figure 6:
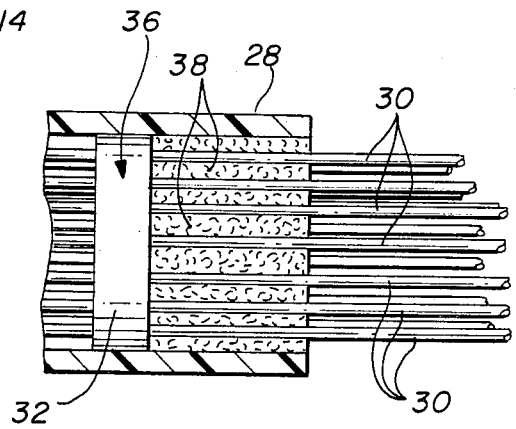
FIG. 6 is a cross-section view of a conduit with the dam installed therein and sealing compound placed in the end of the conduit to seal the conduit shut.

As can be seen in FIG. 6, the completed wire dam 36 can be compressed and slipped inside the conduit 28 a predetermined distance with the wires 30 extending out of the conduit 28. A sealing compound 38 can be then inserted in the end of conduit 28 from the wire dam 36 outwardly to the end of the conduit 28 thereby sealing the conduit. Because the wire dam 36 has been compressed and then installed in the conduit and has expanded, it has sealed the inside of the conduit to prevent the sealing compound 38 from getting past the dam 36.

With the present dam assembly, one assembly can be used for sealing wire harnesses that vary in size from one wire up to forty wires depending upon the length the strip is cut and the diameter conduit used. The wire harnesses can be assembled with connectors and plugs already attached before using the dam, whereas in the prior art, the dam has to be assembled first and then the plugs can be attached to the wires.

Thus, there has been disclosed a novel multi-wire dam which comprises a molded strip having equally spaced recesses molded preferably on only one side of the strip to a depth of the wire diameter which would be less than one-half the thickness of the strip. The strips are molded of an elastic material soft enough to compress and seal any recess that does not have a wire in it to eliminate the necessity of plugs in those unused recesses. The diameter of the conduit does not have to change because of varying number of wires that might have to be sealed in the conduit. The molded strip can be trimmed to cut off excess material and allow it to be used as a dam for a small conduit or can be trimmed to accommodate variations of the number of wires required to be sealed. By placing an adhesive or a double sided adhesive tape on the open recess side of the molded strip, it allows the wire harness and strip when rolled into a cylindrical shape to hold its shape until it is installed in the conduit. A smooth surface tape can be applied to the outside of the assembly to allow for easy insertion into the conduit. The compressibility of the elastic molded strip will allow the wire dam to be installed in a conduit where it can expand to seal the inside of the conduit to prevent sealant from getting past the wire dam.

Although a preferred embodiment of the invention has been described in detail herein, those skilled in the art will recognize that various substitutions and modifications may be made to the specific instructions and function of the elements illustrated without departing from the scope and spirit of the invention as recited in the appended claims.

I claim:

1. A multi-wire conduit dam comprising:
   a. a molded strip of compressible material rolled into a cylinder and having a plurality of recesses on at least one side of said strip,
   b. at least one electrical conductor positioned in a respective one of said recesses prior to the formation of said cylinder,
   c. an adhesive placed over said recesses and said at least one conductor to cause said strip to hold its shape when said strip is rolled into said cylinder, and
   d. a smooth surface tape applied to the outside of said rolled cylinder for allowing easy insertion of said cylinder with said at least one conductor into a conduit to form a conduit dam.

2. A multi-wire conduit dam as in claim 1 wherein said plurality of recesses are equally spaced along said at least one side of said strip.

3. A multi-wire conduit dam as in claim 2 wherein said adhesive is a double sided adhesive tape.

4. A method of forming a multi-wire conduit dam comprising the steps of:
   a. rolling a molded strip of compressible material into a cylinder, said strip having a plurality of recesses on at least one side of said strip,
   b. positioning at least one electrical conductor in a respective one of said recesses,
   c. placing an adhesive over said recesses and said at least one conductor to cause said strip to hold its shape when said strip is rolled into said cylinder, and
   d. applying a smooth surface tape to the outside of said rolled cylinder for allowing easy insertion of said cylinder with at least one conductor into a conduit to form a conduit dam.

5. A method as in claim 4 further comprising the step of equally spacing said plurality of recesses on said at least one side of said strip.

6. A method as in claim 5 further comprising the step of using a double sided adhesive tape as said adhesive.

7. A method of forming a multi-wire conduit dam comprising the steps of:
   a. forming a molded strip of compressible material having a plurality of recesses on at least one side of said strip,
   b. placing at least one electrical conductor in a respective one of said recesses,
   c. covering said strip and said at least one conductor with double sided adhesive tape,
   d. rolling said strip with said conductor in said recess into a cylinder which is held in shape by said double sided adhesive tape, and
   e. wrapping a smooth surface tape around the outside of said cylinder for allowing easy insertion of said cylinder with said at least one conductor into a conduit to form a conduit dam.

* * * * *